(12) United States Patent
Sasaki et al.

(10) Patent No.: US 9,082,422 B2
(45) Date of Patent: Jul. 14, 2015

(54) MAGNETIC HEAD FOR PERPENDICULAR MAGNETIC RECORDING INCLUDING A MAIN POLE AND A WRITE SHIELD TO PROVIDE IMPROVED WRITE CHARACTERISTICS WITHOUT COMPROMISING THE FUNCTION OF THE WRITE SHIELD

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Hironori Araki, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Hironori Araki, Milpitas, CA (US); Tatsuya Shimizu, Hong Kong (CN)

(73) Assignees: HEADWAY TECHNOLOGIES, INC., Milpitas, CA (US); SAE MAGNETICS (H.K.) LTD., Hong Kong (CN)

( * ) Notice: Subject to any disclaimer, the term of this patent is extended or adjusted under 35 U.S.C. 154(b) by 16 days.

(21) Appl. No.: 14/107,701

(22) Filed: Dec. 16, 2013

(65) Prior Publication Data
US 2015/0170679 A1 Jun. 18, 2015

(51) Int. Cl.
G11B 5/127 (2006.01)
G11B 5/11 (2006.01)
G11B 5/17 (2006.01)
G11B 5/31 (2006.01)

(52) U.S. Cl.
CPC ............ *G11B 5/11* (2013.01); *G11B 5/1278* (2013.01); *G11B 5/17* (2013.01); *G11B 5/3116* (2013.01); *G11B 5/3163* (2013.01)

(58) Field of Classification Search
USPC ............... 360/123.02, 123.03, 123.06, 123.1, 360/125.02, 125.03, 125.3, 125.08, 125.11, 360/125.12, 125.15

See application file for complete search history.

(56) References Cited

U.S. PATENT DOCUMENTS

| | | | | |
|---|---|---|---|---|
| 7,215,502 | B2 * | 5/2007 | Tagami | 360/77.08 |
| 7,219,414 | B2 * | 5/2007 | Watabe et al. | 29/603.13 |
| 7,612,963 | B2 * | 11/2009 | Allen et al. | 360/123.06 |
| 7,755,864 | B2 * | 7/2010 | Kato et al. | 360/234.5 |
| 7,924,528 | B2 * | 4/2011 | Sasaki et al. | 360/125.15 |
| 8,035,922 | B2 * | 10/2011 | Lille et al. | 360/123.06 |
| 8,201,320 | B2 * | 6/2012 | Allen et al. | 29/603.16 |
| 8,233,235 | B2 * | 7/2012 | Chen et al. | 360/125.15 |
| 8,274,759 | B1 * | 9/2012 | Sasaki et al. | 360/125.13 |
| 8,295,008 | B1 * | 10/2012 | Sasaki et al. | 360/125.02 |
| 8,345,382 | B1 * | 1/2013 | Sasaki et al. | 360/123.06 |
| 8,385,019 | B1 * | 2/2013 | Sasaki et al. | 360/123.03 |
| 8,416,528 | B1 * | 4/2013 | Sasaki et al. | 360/125.02 |

(Continued)

OTHER PUBLICATIONS

U.S. Appl. No. 14/107,714, filed Dec. 16, 2013 in the name of Sasaki et al.

*Primary Examiner* — Brian Miller
(74) *Attorney, Agent, or Firm* — Oliff PLC

(57) ABSTRACT

A magnetic head includes a main pole, a write shield, and first and second nonmagnetic layers. The main pole has a top surface including an inclined surface portion. The write shield includes an inclined portion facing toward the top surface of the main pole. The first nonmagnetic layer is interposed between the inclined surface portion and the inclined portion. The second nonmagnetic layer is interposed between the first nonmagnetic layer and the inclined portion. The first nonmagnetic layer has a first front end located in a medium facing surface. The second nonmagnetic layer has a second front end that is located closest to but at a distance from the medium facing surface.

7 Claims, 11 Drawing Sheets

(56) References Cited

U.S. PATENT DOCUMENTS

| | | | |
|---|---|---|---|
| 8,422,166 B1 * | 4/2013 | Sasaki et al. | 360/123.06 |
| 8,441,755 B2 * | 5/2013 | Sasaki et al. | 360/123.03 |
| 8,503,130 B1 * | 8/2013 | Sasaki et al. | 360/123.06 |
| 8,767,347 B1 * | 7/2014 | Sasaki et al. | 360/125.13 |
| 8,867,169 B2 * | 10/2014 | Sasaki et al. | 360/125.26 |
| 2008/0151424 A1 * | 6/2008 | Bedell et al. | 360/123.19 |
| 2012/0140361 A1 * | 6/2012 | Ota et al. | 360/294 |

* cited by examiner

MAGNETIC HEAD FOR PERPENDICULAR MAGNETIC RECORDING INCLUDING A MAIN POLE AND A WRITE SHIELD TO PROVIDE IMPROVED WRITE CHARACTERISTICS WITHOUT COMPROMISING THE FUNCTION OF THE WRITE SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a main pole and a shield.

2. Description of the Related Art

The recording systems of magnetic read/write apparatuses include a longitudinal magnetic recording system in which signals are magnetized in a direction along the plane of a recording medium (the longitudinal direction) and a perpendicular magnetic recording system in which signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the unwanted erasure.

A known technique for preventing the unwanted erasure induced by a skew is to configure the main pole so that its end face located in the medium facing surface decreases in width with increasing proximity to the top surface of the substrate, as described in U.S. Pat. No. 8,274,759 B1, for example. U.S. Pat. No. 8,274,759 B1 also describes a technique for configuring the main pole so that its thickness in the vicinity of the medium facing surface decreases with increasing proximity to the medium facing surface.

In order to prevent the unwanted erasure induced by a skew, it is also effective to reduce the thickness of the main pole in the medium facing surface. If the entire main pole is thinned, however, the main pole becomes small in cross-sectional area perpendicular to the direction in which magnetic flux flows. This makes it difficult for the main pole to guide much magnetic flux to the medium facing surface, thus leading to degradation of overwrite property.

Configuring the main pole so that its thickness in the vicinity of the medium facing surface decreases with increasing proximity to the medium facing surface as described in U.S. Pat. No. 8,274,759 B1 allows the main pole to have a small thickness in the medium facing surface and a large thickness in a portion away from the medium facing surface, thereby making it possible for the main pole to guide much magnetic flux to the medium facing surface.

Further, in order to prevent the unwanted erasure induced by a skew and achieve higher recording densities, it is effective to provide a write shield having an end face that is located in the medium facing surface at a position on the front side in the direction of travel of the recording medium relative to the end face of the main pole, as described in U.S. Pat. No. 8,274,759 B1.

A magnetic head having the write shield is typically provided with a return path section for connecting the write shield and part of the main pole located away from the medium facing surface to each other. The write shield, the return path section and the main pole define a space through which a coil portion passes. The write shield and the return path section have the function of capturing a magnetic flux that is produced from the end face of the main pole and spreads in directions other than the direction perpendicular to the plane of the recording medium, thereby preventing the magnetic flux from reaching the recording medium. The write shield and the return path section also have the function of allowing a magnetic flux that has been produced from the end face of the main pole and has magnetized the recording medium to flow back to the main pole.

The position of an end of a record bit to be recorded on the recording medium is determined by the position of an end of the end face of the main pole located in the medium facing surface, the end being located on the front side in the direction of travel of the recording medium. In order to define the position of the end of the record bit accurately, it is therefore important that the write shield have an end face that is located in the medium facing surface at a position on the front side in the direction of travel of the recording medium relative to the end face of the main pole and that this end face of the write shield capture a magnetic flux that is produced from the end face of the main pole and spreads in directions other than the direction perpendicular to the plane of the recording medium.

The magnetic head having the write shield allows for prevention of the unwanted erasure and is able to provide a further improved recording density.

In view of the foregoing, in order to prevent the unwanted erasure induced by a skew and provide a higher recording density, the magnetic head can conceivably be configured so that a portion of the top surface of the main pole in the vicinity of the medium facing surface is formed into an inclined portion inclined relative to a direction perpendicular to the medium facing surface, and the write shield is provided with an inclined surface opposed to the inclined portion of the main pole.

In the above-described configuration, however, if the inclined portion of the top surface of the main pole and the inclined surface of the write shield are opposed to each other over a large area with a small spacing therebetween, there arises a problem that much magnetic flux leaks from the main pole to the write shield to cause degradation of write characteristics such as the overwrite property. To avoid this, at least one of the inclined portion and the inclined surface may be reduced in length in the direction perpendicular to the medium facing surface.

Reducing the inclined portion in length in the direction perpendicular to the medium facing surface, however, precludes a sufficient increase in the thickness of a portion of the main pole that is located farther from the medium facing surface than is the inclined portion. This causes the main pole to become unable to guide much magnetic flux to the medium facing surface, and thus leads to degradation of write characteristics such as the overwrite property.

On the other hand, reducing the inclined surface in length in the direction perpendicular to the medium facing surface causes a reduction in the volume of a portion of the write shield that is located on the front side in the direction of travel of the recording medium relative to the main pole, thereby compromising the function of the write shield. More specifically, the reduction in the volume of the aforementioned portion of the write shield is likely to cause the saturation of magnetic flux in that portion. This in turn causes leakage of magnetic flux from the portion toward the medium facing surface, thus raising a problem that the leakage flux may cause accidental erasure of data stored on the recording medium.

Thus, for the magnetic head including the write shield, it has conventionally been difficult to improve the write characteristics without compromising the function of the write shield.

OBJECT AND SUMMARY OF THE INVENTION

It is an object of the present invention to provide a magnetic head for perpendicular magnetic recording that is capable of providing improved write characteristics without compromising the function of the write shield.

A magnetic head for perpendicular magnetic recording of the present invention includes: a medium facing surface facing a recording medium; a coil producing a magnetic field that corresponds to data to be written on the recording medium; a main pole; and a write shield. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The write shield is formed of a magnetic material and has an end face located in the medium facing surface.

The end face of the write shield includes a first end face portion located on the front side in the direction of travel of the recording medium relative to the end face of the main pole. The main pole has a top surface lying at the front end in the direction of travel of the recording medium. The top surface of the main pole includes an inclined surface portion. The inclined surface portion has a first end located in the medium facing surface and a second end opposite to the first end. An entirety of the inclined surface portion is inclined relative to the medium facing surface and a direction perpendicular to the medium facing surface such that the second end is located on the front side in the direction of travel of the recording medium relative to the first end.

The write shield includes an inclined portion facing toward the top surface of the main pole. The inclined portion has a third end located in the medium facing surface and a fourth end opposite to the third end. The inclined portion is inclined relative to the medium facing surface and the direction perpendicular to the medium facing surface such that the fourth end is located on the front side in the direction of travel of the recording medium relative to the third end.

The magnetic head of the present invention further includes a first nonmagnetic layer and a second nonmagnetic layer. The first nonmagnetic layer is interposed between the inclined surface portion and the inclined portion, and has a first front end located in the medium facing surface. The second nonmagnetic layer is interposed between the first nonmagnetic layer and the inclined portion, and has a second front end that is located closest to but at a distance from the medium facing surface. The distance from the medium facing surface to the second front end is smaller than the distance from the medium facing surface to the second end of the inclined surface portion.

In the magnetic head of the present invention, the top surface of the main pole may further include a flat surface portion that is located farther from the medium facing surface than is the inclined surface portion. The flat surface portion is connected to the inclined surface portion at the second end and extends substantially perpendicular to the medium facing surface.

The magnetic head of the present invention may further include a third nonmagnetic layer. The third nonmagnetic layer is interposed between the second nonmagnetic layer and the inclined portion, and has a third front end closest to the medium facing surface. The distance from the medium facing surface to the third front end is greater than the distance from the medium facing surface to the second front end and smaller than the distance from the medium facing surface to the second end of the inclined surface portion.

The magnetic head of the present invention may further include a first return path section formed of a magnetic material. The first return path section is located on the front side in the direction of travel of the recording medium relative to the main pole, and connects the write shield and part of the main pole located away from the medium facing surface to each other so that a first space is defined by the main pole, the write shield and the first return path section. In this case, the coil may include a first coil portion passing through the first space.

In the magnetic head of the present invention, the end face of the write shield may include a second end face portion located on the rear side in the direction of travel of the recording medium relative to the end face of the main pole. In this case, the magnetic head of the present invention may further include a first return path section and a second return path section each formed of a magnetic material. The first return path section is located on the front side in the direction of travel of the recording medium relative to the main pole, and connects the write shield and part of the main pole located away from the medium facing surface to each other so that a first space is defined by the main pole, the write shield and the first return path section. The second return path section is located on the rear side in the direction of travel of the recording medium relative to the main pole, and connects the write shield and part of the main pole located away from the medium facing surface to each other so that a second space is defined by the main pole, the write shield and the second return path section. In this case, the coil may include a first coil portion passing through the first space and a second coil portion passing through the second space. The end face of the write shield may further include a third end face portion and a fourth end face portion. The third end face portion and the fourth end face portion may be located on opposite sides of the end face of the main pole in the track width direction.

In the magnetic head of the present invention, the top surface of the main pole includes the inclined surface portion. This allows the main pole to have a small thickness in the medium facing surface and a large thickness in a portion away from the medium facing surface.

Further, in the present invention, the first and second nonmagnetic layers are interposed between the inclined surface portion of the top surface of the main pole and the inclined portion of the write shield. The first nonmagnetic layer has the first front end located in the medium facing surface. The second nonmagnetic layer has the second front end located at a distance from the medium facing surface. These features of the present invention make it possible that, even if the inclined surface portion and the inclined portion are both increased in length in the direction perpendicular to the medium facing surface, the region in which the inclined surface portion and the inclined portion are opposed to each other with only the first nonmagnetic layer interposed therebetween is reduced in area while the distance between the end face of the main pole and the first end face portion of the end face of the write shield in the medium facing surface is adjusted to a desired value. It is thereby possible to reduce leakage of magnetic flux from the main pole to the write shield.

Consequently, the present invention makes it possible to improve the write characteristics of the magnetic head without compromising the function of the write shield.

Other objects, features and advantages of the present invention will become fully apparent from the following description.

DETAILED DESCRIPTION OF THE PREFERRED EMBODIMENTS

First Embodiment

Figure 3:
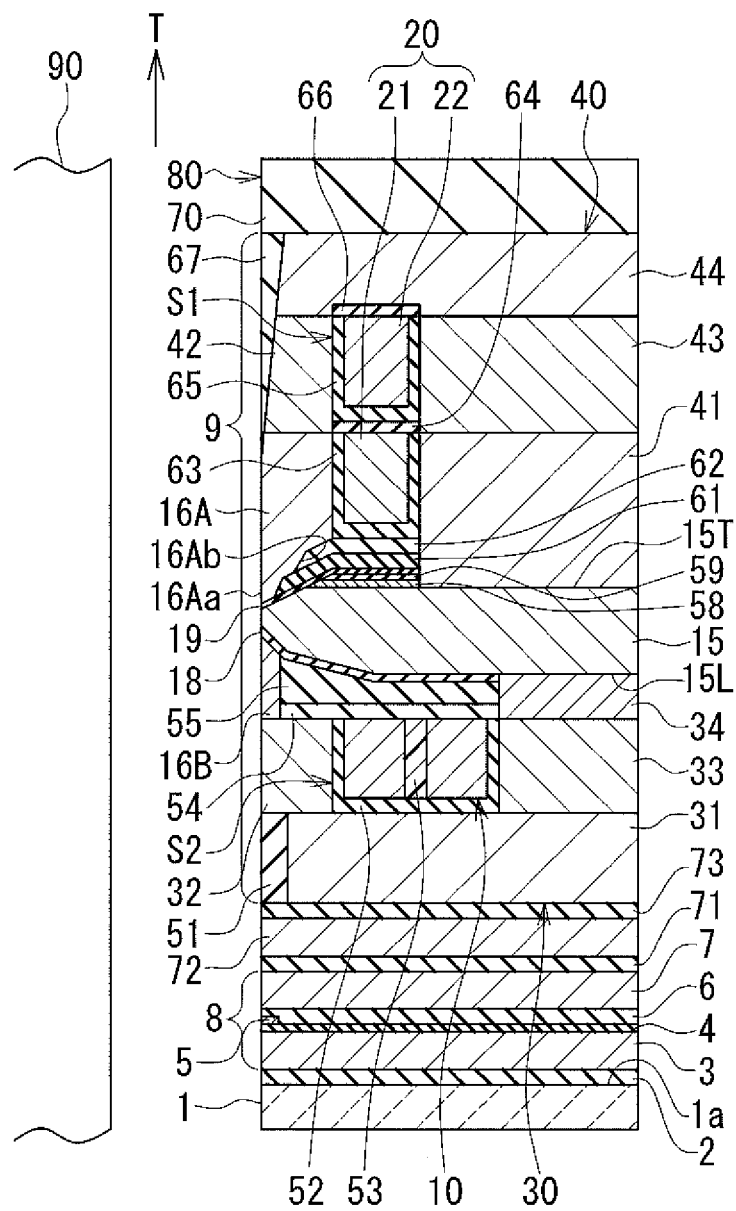
FIG. 3 is a cross-sectional view of the magnetic head according to the first embodiment of the invention.
Figure 4:
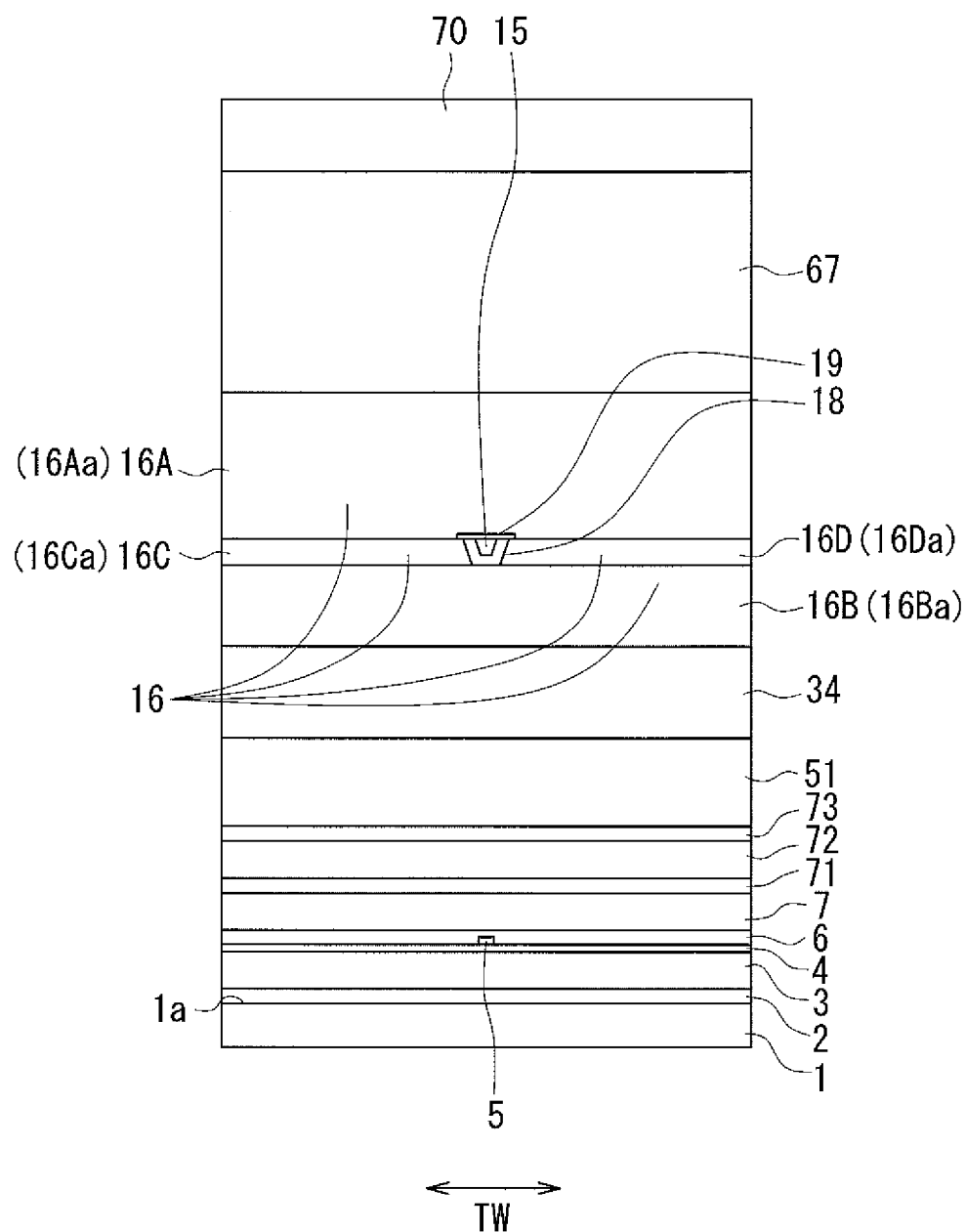
FIG. 4 is a front view showing the medium facing surface of the magnetic head according to the first embodiment of the invention.
Figure 5:
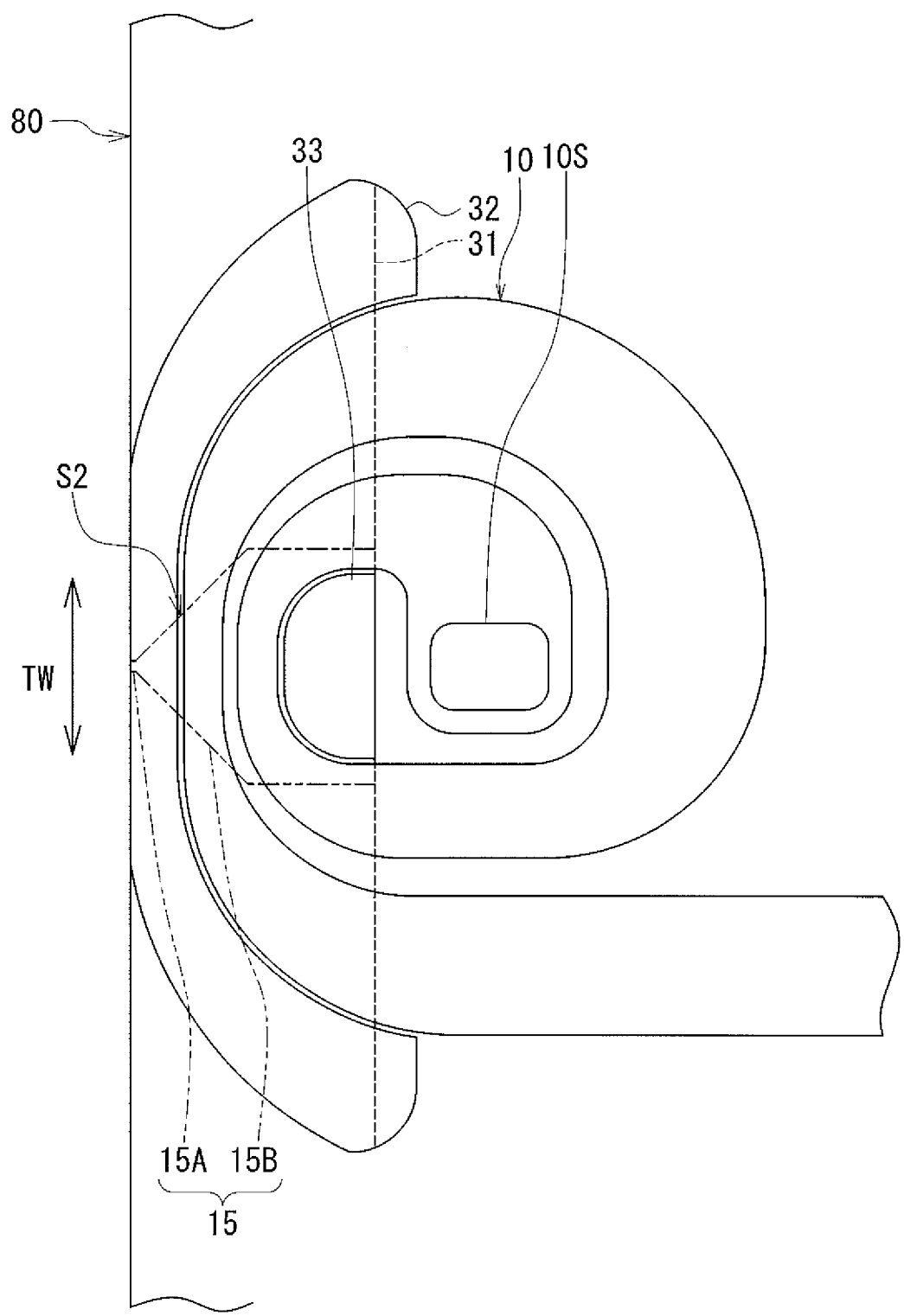
FIG. 5 is a plan view showing a second coil portion of a coil of the magnetic head according to the first embodiment of the invention.
Figure 6:
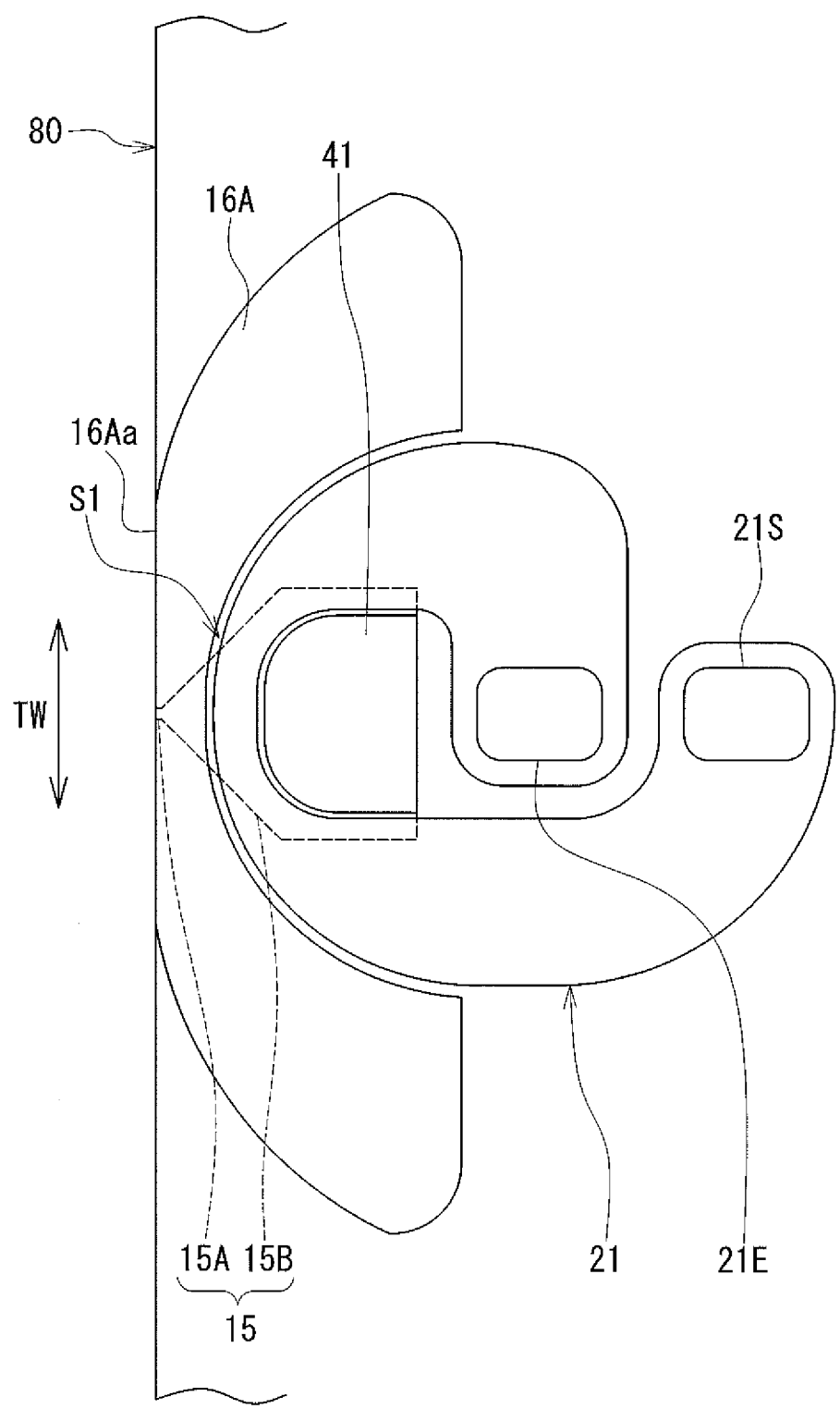
FIG. 6 is a plan view showing a first layer of a first coil portion of the coil of the magnetic head according to the first embodiment of the invention.
Figure 7:
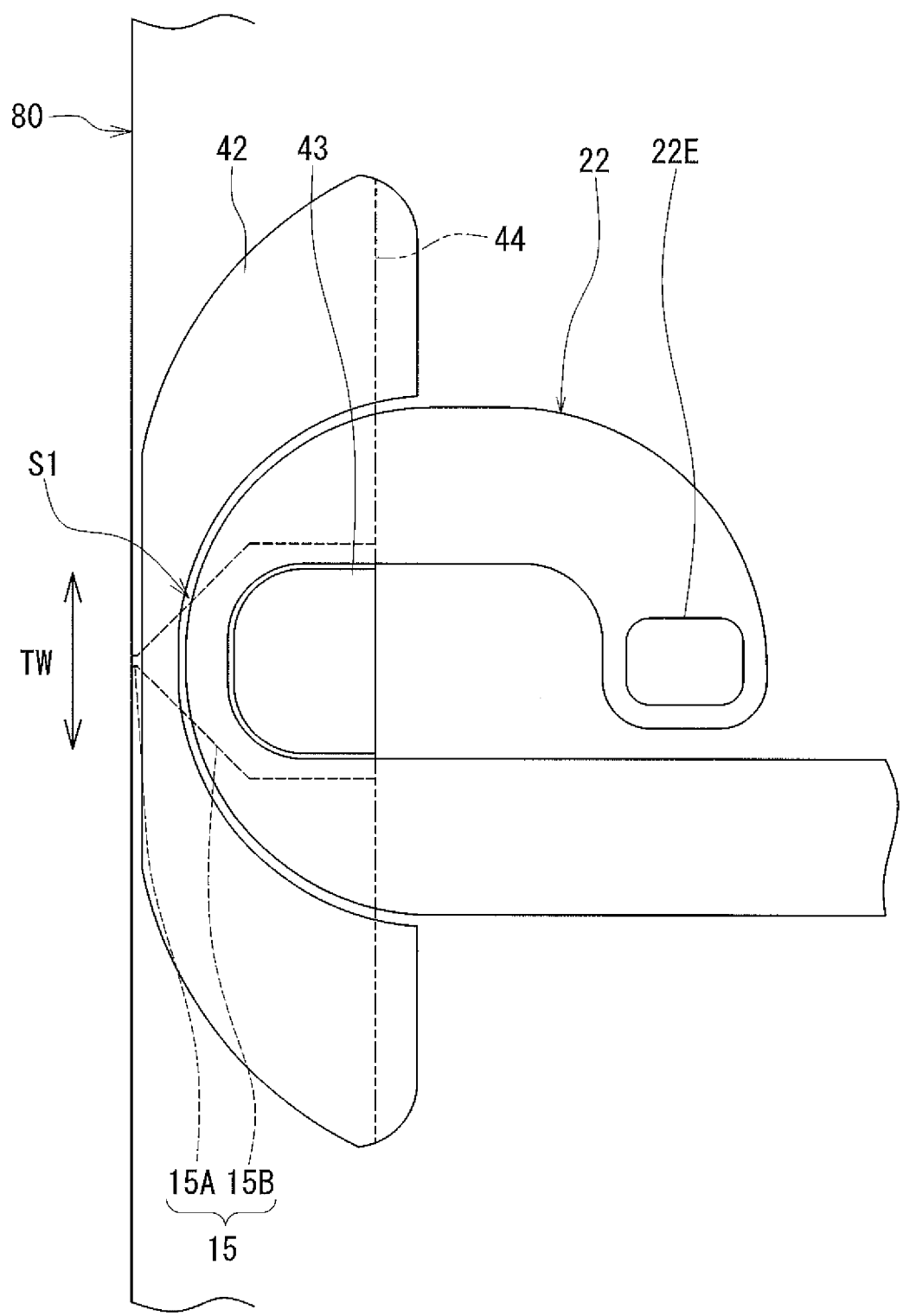
FIG. 7 is a plan view showing a second layer of the first coil portion of the coil of the magnetic head according to the first embodiment of the invention.

Preferred embodiments of the present invention will now be described in detail with reference to the drawings. First, reference is made to FIG. 3 to FIG. 7 to describe the configuration of a magnetic head according to a first embodiment of the invention. FIG. 3 is a cross-sectional view of the magnetic head according to the present embodiment. The arrow with the symbol T in FIG. 3 indicates the direction of travel of a recording medium. FIG. 4 is a front view showing the medium facing surface of the magnetic head according to the present embodiment. FIG. 5 is a plan view showing a second coil portion of a coil of the magnetic head according to the present embodiment. FIG. 6 is a plan view showing a first layer of a first coil portion of the coil of the magnetic head according to the present embodiment. FIG. 7 is a plan view showing a second layer of the first coil portion of the coil of the magnetic head according to the present embodiment. The arrow with the symbol TW in each of FIG. 4 to FIG. 7 indicates the track width direction.

The magnetic head for perpendicular magnetic recording (hereinafter simply referred to as the magnetic head) according to the present embodiment is for use in, for example, a magnetic disk drive and is in the form of a slider to fly over the surface of a rotating recording medium 90. As shown in FIG. 3, the magnetic head (the slider) has a medium facing surface 80 facing the recording medium 90. The medium facing surface 80 has an air inflow end (a leading end) and an air outflow end (a trailing end). The slider is designed to slightly fly over the surface of the recording medium 90 by means of an airflow that comes from the leading end into the space between the medium facing surface 80 and the recording medium 90.

As shown in FIG. 3 and FIG. 4, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated at the write head unit 9. The nonmagnetic layers 71 and 73 are formed of alumina, for example.

The write head unit 9 includes a coil, a main pole 15, and a write shield 16. The coil produces a magnetic field corresponding to data to be written on the recording medium 90. The coil includes a first coil portion 20 and a second coil portion 10. The first coil portion 20 and the second coil portion 10 are both formed of a conductive material such as copper. The first coil portion 20 and the second coil portion 10 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium 90 by means of a perpendicular magnetic recording system. Consequently, a magnetic flux is produced from the end face of the main pole 15 and magnetizes a portion of the recording medium 90. FIG. 3 shows a cross section that intersects the end face of the main pole 15 located in the medium facing surface 80 and that is perpendicular to the medium facing surface 80 and to the top surface 1a of the substrate 1 (this cross section will hereinafter be referred to as the main cross section).

The write shield 16 has an end face located in the medium facing surface 80. The end face of the write shield 16 includes first to fourth end face portions 16Aa, 16Ba, 16Ca and 16Da. The first end face portion 16Aa is located on the front side in the direction T of travel of the recording medium 90 relative to the end face of the main pole 15. The front side in the direction T of travel of the recording medium 90 refers to the side of the positions closer to the trailing end relative to a reference position. The second end face portion 16Ba is located on the rear side in the direction T of travel of the recording medium 90 relative to the end face of the main pole 15. The rear side in the direction T of travel of the recording medium 90 refers to the side of the positions closer to the leading end relative to the reference position. The third and fourth end face portions 16Ca and 16Da are located on opposite sides of the end face of the main pole 15 in the track width direction TW. In the medium facing surface 80, the first to fourth end face portions 16Aa, 16Ba, 16Ca and 16Da are arranged to wrap around the end face of the main pole 15.

The write shield 16 is formed of a magnetic material. For example, CoFeN, CoNiFe, NiFe, or CoFe can be used to form the write shield 16.

The write head unit 9 further includes a first return path section 40 and a second return path section 30. The first return path section 40 and the second return path section 30 are each formed of a magnetic material. For example, CoFeN, CoNiFe, NiFe, or CoFe can be used to form each of the first return path section 40 and the second return path section 30. The first return path section 40 and the second return path section 30 are in alignment with each other in a direction perpendicular to the top surface 1a of the substrate 1 with the main pole 15 interposed therebetween. The first return path section 40 is located on the front side in the direction T of travel of the recording medium 90 relative to the main pole 15, and connects the write shield 16 and part of the main pole 15 located away from the medium facing surface 80 to each other, thereby magnetically coupling the write shield 16 and the main pole 15 to each other. The second return path section 30 is located on the rear side in the direction T of travel of the recording medium 90 relative to the main pole 15, and connects the write shield 16 and part of the main pole 15 located away from the medium facing surface 80 to each other, thereby magnetically coupling the write shield 16 and the main pole 15 to each other.

The second return path section 30 includes magnetic layers 31, 32, 33 and 34. The magnetic layer 31 lies on the nonmagnetic layer 73. The magnetic layers 32 and 33 both lie on the magnetic layer 31. The magnetic layer 32 is located near the medium facing surface 80. The magnetic layer 33 is located farther from the medium facing surface 80 than is the magnetic layer 32. The magnetic layer 31 has an end face facing toward the medium facing surface 80, and this end face of the magnetic layer 31 is located at a distance from the medium facing surface 80. The magnetic layer 32 has an end face located in the medium facing surface 80. As shown in FIG. 5, the second coil portion 10 is wound approximately two turns around the magnetic layer 33.

The magnetic head further includes: an insulating layer 51 formed of an insulating material, lying on the nonmagnetic layer 73 and surrounding the magnetic layer 31; an insulating film 52 formed of an insulating material and isolating the second coil portion 10 from the magnetic layers 31 to 33; an insulating layer 53 formed of an insulating material and disposed in the space between adjacent turns of the second coil portion 10; and an insulating layer (not illustrated) formed of an insulating material and disposed around the second coil portion 10 and the magnetic layer 32. The top surfaces of the second coil portion 10, the magnetic layers 32 and 33, the insulating film 52, the insulating layer 53 and the non-illustrated insulating layer are even with each other. The insulating layer 51, the insulating film 52 and the non-illustrated insulating layer are formed of alumina, for example. The insulating layer 53 is formed of a photoresist, for example.

As shown in FIG. 4, the write shield 16 includes a first shield 16A, a second shield 16B, and two side shields 16C and 16D. The first shield 16A is located on the front side in the direction T of travel of the recording medium 90 relative to the main pole 15. The second shield 16B is located on the rear side in the direction T of travel of the recording medium 90 relative to the main pole 15. The two side shields 16C and 16D are located on opposite sides of the main pole 15 in the track width direction TW and magnetically couple the first shield 16A and the second shield 16B to each other.

As shown in FIG. 3 and FIG. 4, the first shield 16A includes: the first end face portion 16Aa; an inclined portion 16Ab facing toward a top surface of the main pole 15 to be described later; a top surface; and a connecting surface connecting the top surface to the first end face portion 16Aa. Since the first shield 16A is part of the write shield 16, the write shield 16 can be said to include the inclined portion 16Ab. The distance from the medium facing surface 80 to an arbitrary point on the connecting surface of the first shield 16A increases with increasing distance from the arbitrary point to the top surface 1a of the substrate 1. The inclined portion 16Ab will be described in detail later. As shown in FIG. 4, the second shield 16B includes the second end face portion 16Ba. The side shield 16C includes the third end face portion 16Ca. The side shield 16D includes the fourth end face portion 16Da.

The second shield 16B lies on the magnetic layer 32. The magnetic layer 34 lies on the magnetic layer 33. The magnetic head further includes an insulating layer 54 formed of an insulating material and a nonmagnetic layer 55 formed of a nonmagnetic material. The insulating layer 54 lies on a portion of the top surface of the magnetic layer 32 and on the top surfaces of the second coil portion 10, the insulating film 52 and the insulating layer 53, and surrounds the second shield 16B and the magnetic layer 34. The nonmagnetic layer 55 lies on the insulating layer 54 and surrounds the second shield 16B and the magnetic layer 34. The insulating layer 54 and the nonmagnetic layer 55 are formed of alumina, for example.

The main pole 15 has a top surface 15T (see FIG. 3) lying at the front end in the direction T of travel of the recording medium 90, a bottom end 15L (see FIG. 3) opposite to the top surface 15T, and first and second side parts (see FIG. 4) opposite to each other in the track width direction TW. The side shield 16C has a first sidewall opposed to the first side part of the main pole 15. The side shield 16D has a second sidewall opposed to the second side part of the main pole 15.

The side shields 16C and 16D are disposed on the second shield 16B. The magnetic head further includes a nonmagnetic film 18 formed of a nonmagnetic material. The nonmagnetic film 18 is arranged to extend along the sidewalls of the side shields 16C and 16D, the top surface of the second shield 16B and the top surface of the nonmagnetic layer 55. The nonmagnetic material used to form the nonmagnetic film 18 may be an insulating material or a nonmagnetic metal material. Alumina is an example of an insulating material that can be used to form the nonmagnetic film 18. Ru is an example of a nonmagnetic metal material that can be used to form the nonmagnetic film 18.

The main pole 15 lies over the second shield 16B and the nonmagnetic layer 55 with the nonmagnetic film 18 interposed between the main pole 15 and the top surface of each of the second shield 16B and the nonmagnetic layer 55. As shown in FIG. 4, the nonmagnetic film 18 is interposed also between the main pole 15 and the side shields 16C and 16D.

A portion of the bottom end 15L of the main pole 15 located away from the medium facing surface 80 is in contact with the top surface of the magnetic layer 34. The main pole 15 is formed of a magnetic metal material. The material of the main pole 15 may be, for example, NiFe, CoNiFe, or CoFe. The shape of the main pole 15 will be described in detail later.

The magnetic head further includes a first refill layer (not illustrated) formed of a nonmagnetic material and disposed around the main pole 15 and the side shields 16C and 16D. The first refill layer is formed of alumina, for example.

The magnetic head further includes a nonmagnetic metal layer 58 formed of a nonmagnetic metal material, located away from the medium facing surface 80 and lying on a portion of the top surface 15T of the main pole 15, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina or $SiO_2$, for example.

The magnetic head further includes a first nonmagnetic layer 19 formed of a nonmagnetic material. The first nonmagnetic layer 19 is disposed to cover the main pole 15, the nonmagnetic metal layer 58 and the insulating layer 59. The material employed for the first nonmagnetic layer 19 may be a nonmagnetic insulating material such as alumina or $SiO_2$, or a nonmagnetic conductive material such as Ru, NiCu, Ta, W, NiB, or NiP.

The magnetic head further includes a second nonmagnetic layer 61 formed of a nonmagnetic material and lying on the first nonmagnetic layer 19, and a third nonmagnetic layer 62 formed of a nonmagnetic material and lying on the second nonmagnetic layer 61. The material employed for each of the second and third nonmagnetic layers 61 and 62 may be a nonmagnetic insulating material or a nonmagnetic conductive material, as with the material for the first nonmagnetic layer 19. Each of the second and third nonmagnetic layers 61 and 62 has a thickness in the range of, for example, 30 to 100 nm, and preferably in the range of 50 to 80 nm. The shapes and locations of the second and third nonmagnetic layers 61 and 62 will be described in detail later.

The first shield 16A lies on the side shields 16C and 16D and the first to third nonmagnetic layers 19, 61 and 62. In the medium facing surface 80, the first end face portion 16Aa of the first shield 16A is at a predetermined distance from the end face of the main pole 15. To make full use of the function of the first shield 16A, it is preferred that the distance between the end face of the main pole 15 and the first end face portion 16Aa of the end face of the write shield 16 in the medium facing surface 80 be relatively small. This distance is determined by and substantially equal to the thickness of the first nonmagnetic layer 19. The thickness of the first nonmagnetic layer 19 falls within the range of, for example, 5 to 60 nm, and preferably within the range of 30 to 60 nm. The end face of the main pole 15 has a side adjacent to the first nonmagnetic layer 19. This side of the end face of the main pole 15 defines the track width.

The first return path section 40 includes magnetic layers 41, 42, 43 and 44. The magnetic layer 41 is located away from the medium facing surface 80 and lies on the main pole 15.

The first coil portion 20 includes a first layer 21 and a second layer 22. As shown in FIG. 6, the first layer 21 is wound one turn around the magnetic layer 41. The magnetic head further includes an insulating film 63 formed of an insulating material and isolating the first layer 21 from the first shield 16A, the magnetic layer 41 and the third nonmagnetic layer 62, and a second refill layer (not illustrated) formed of a nonmagnetic material and disposed around the first shield 16A and the first layer 21. The insulating film 63 and the second refill layer are formed of alumina, for example. The top surfaces of the first shield 16A, the first layer 21, the magnetic layer 41, the insulating film 63 and the second refill layer are even with each other. The magnetic head further includes an insulating layer 64 formed of an insulating material and disposed over the top surfaces of the first layer 21 and the insulating film 63. The insulating layer 64 is formed of alumina, for example.

The magnetic layer 42 lies on the first shield 16A. The magnetic layer 42 has an end face facing toward the medium facing surface 80, and this end face of the magnetic layer 42 is located at a distance from the medium facing surface 80. The distance from the medium facing surface 80 to an arbitrary point on the end face of the magnetic layer 42 increases with increasing distance from the arbitrary point to the top surface 1a of the substrate 1.

The magnetic layer 43 lies on the magnetic layer 41. As shown in FIG. 7, the second layer 22 is wound approximately one turn around the magnetic layer 43. The magnetic head further includes an insulating film 65 formed of an insulating material and isolating the second layer 22 from the magnetic layers 42 and 43 and the insulating layer 64, and a third refill layer (not illustrated) formed of a nonmagnetic material and disposed around the second layer 22 and the magnetic layer 42. The insulating film 65 and the third refill layer are formed of alumina, for example. The top surfaces of the second layer 22, the magnetic layers 42 and 43, the insulating film 65 and the third refill layer are even with each other. The magnetic head further includes an insulating layer 66 formed of an insulating material and disposed over the top surfaces of the second layer 22 and the insulating film 65. The insulating layer 66 is formed of alumina, for example.

The magnetic layer 44 lies on the magnetic layers 42 and 43 and the insulating layer 66, and connects the magnetic layer 42 to the magnetic layer 43. The magnetic layer 44 has an end face facing toward the medium facing surface 80, and this end face of the magnetic layer 44 is located at a distance from the medium facing surface 80. The distance from the medium facing surface 80 to an arbitrary point on the end face of the magnetic layer 44 increases with increasing distance from the arbitrary point to the top surface 1a of the substrate 1.

The magnetic head further includes a nonmagnetic layer 67 formed of a nonmagnetic material and disposed around the magnetic layer 44, and a protective layer 70 formed of a nonmagnetic material and disposed to cover the write head unit 9. A portion of the nonmagnetic layer 67 is interposed between the medium facing surface 80 and each of the connecting surface of the first shield 16A and the respective end faces of the magnetic layers 42 and 44 facing toward the medium facing surface 80. The nonmagnetic layer 67 and the protective layer 70 are formed of alumina, for example.

As has been described, the magnetic head according to the present embodiment includes the medium facing surface 80, the read head unit 8, and the write head unit 9. The read head unit 8 and the write head unit 9 are stacked on the substrate 1. The read head unit 8 is located on the rear side in the direction T of travel of the recording medium 90 relative to the write head unit 9.

The write head unit 9 includes the coil including the first coil portion 20 and the second coil portion 10, the main pole 15, the write shield 16, the first return path section 40, the second return path section 30, and the first to third nonmagnetic layers 19, 61 and 62. The write shield 16 includes the first shield 16A, the second shield 16B, and the two side shields 16C and 16D.

The first return path section 40 includes the magnetic layers 41 to 44, and is located on the front side in the direction T of travel of the recording medium 90 relative to the main pole 15. The first return path section 40 connects the write shield 16 (the first shield 16A) and part of the main pole 15 located away from the medium facing surface 80 to each other so that a first space S1 is defined by the main pole 15, the write shield 16 and the first return path section 40 (the magnetic layers 41 to 44).

The second return path section 30 includes the magnetic layers 31 to 34, and is located on the rear side in the direction T of travel of the recording medium 90 relative to the main pole 15. The second return path section 30 connects the write shield 16 (the second shield 16B) and part of the main pole 15 located away from the medium facing surface 80 to each other so that a second space S2 is defined by the main pole 15, the write shield 16 and the second return path section 30 (the magnetic layers 31 to 34).

The first coil portion 20 and the second coil portion 10 will now be described in detail with reference to FIG. 5 to FIG. 7. As shown in FIG. 5, the second coil portion 10 is wound approximately two turns around the magnetic layer 33. The second coil portion 10 includes a portion extending to pass through the second space S2. The second coil portion 10 has a coil connection 10S electrically connected to the first coil portion 20.

As shown in FIG. 6, the first layer 21 of the first coil portion 20 is wound one turn around the magnetic layer 41. The first layer 21 includes a portion extending to pass between the first shield 16A and the magnetic layer 41, in particular, within the first space S1. The first layer 21 has a coil connection 21S electrically connected to the second layer 22, and a coil connection 21E electrically connected to the coil connection 10S of the second coil portion 10. The coil connection 21E is electrically connected to the coil connection 10S via first and second connecting layers of columnar shape (not illustrated) that penetrate a plurality of layers interposed between the first layer 21 and the second coil portion 10. The first and second connecting layers are stacked in this order on the coil connection 10S. The coil connection 21E lies on the second connecting layer. The first and second connecting layers are each formed of a conductive material such as copper.

As shown in FIG. 7, the second layer 22 of the first coil portion 20 is wound approximately one turn around the magnetic layer 43. The second layer 22 includes a portion extending to pass between the magnetic layer 42 and the magnetic layer 43, in particular, within the first space S1. The second layer 22 has a coil connection 22E penetrating the insulating layer 64 and the insulating film 65 and electrically connected to the coil connection 21S of the first layer 21. In the example shown in FIG. 5 to FIG. 7, the first coil portion 20 and the second coil portion 10 are connected in series.

The shapes of the first shield 16A, the second shield 16B and the magnetic layers 31 to 34 and 41 to 44 will now be described in detail with reference to FIG. 5 to FIG. 7. As shown in FIG. 6, the first shield 16A includes a central portion, and two side portions located on opposite sides of the central portion in the track width direction TW. The central portion includes the first end face portion 16Aa of the first shield 16A, and is disposed to intersect the main cross section. The two side portions are greater than the central portion in maximum length in a direction perpendicular to the medium facing surface 80. As shown in FIG. 7, the magnetic layer 42 also includes a central portion intersecting the main cross section, and two side portions, as does the first shield 16A.

As shown in FIG. 5, the magnetic layer 32 includes a central portion, and two side portions located on opposite sides of the central portion in the track width direction TW. The central portion includes the end face of the magnetic layer 32 located in the medium facing surface 80, and is disposed to intersect the main cross section. The two side portions are greater than the central portion in maximum length in the direction perpendicular to the medium facing surface 80. Although not illustrated, the second shield 16B also includes a central portion and two side portions, as does the magnetic layer 32. The central portion includes the second end face portion 16Ba of the second shield 16B and intersects the main cross section.

The first shield 16A and the magnetic layers 41 to 44 constitute a first coil surrounding portion shaped to surround a part of the first coil portion 20. The first coil surrounding portion has a first end face constituted of the first end face portion 16Aa of the first shield 16A. The first coil surrounding portion defines a space (hereinafter referred to as the first coil receiving space) whose width in the track width direction TW increases with increasing distance from the medium facing surface 80. As shown in FIG. 6 and FIG. 7, the width of the first end face in the track width direction TW is smaller than the maximum width of the first coil receiving space in the track width direction TW.

Likewise, the second shield 16B and the magnetic layers 31 to 34 constitute a second coil surrounding portion shaped to surround a part of the second coil portion 10. The second coil surrounding portion has a second end face constituted of the second end face portion 16Ba of the second shield 16B and the end face of the magnetic layer 32. The second coil surrounding portion defines a space (hereinafter referred to as the second coil receiving space) whose width in the track width direction TW increases with increasing distance from the medium facing surface 80. As shown in FIG. 5, the width of the second end face in the track width direction TW is smaller than the maximum width of the second coil receiving space in the track width direction TW.

Figure 2:
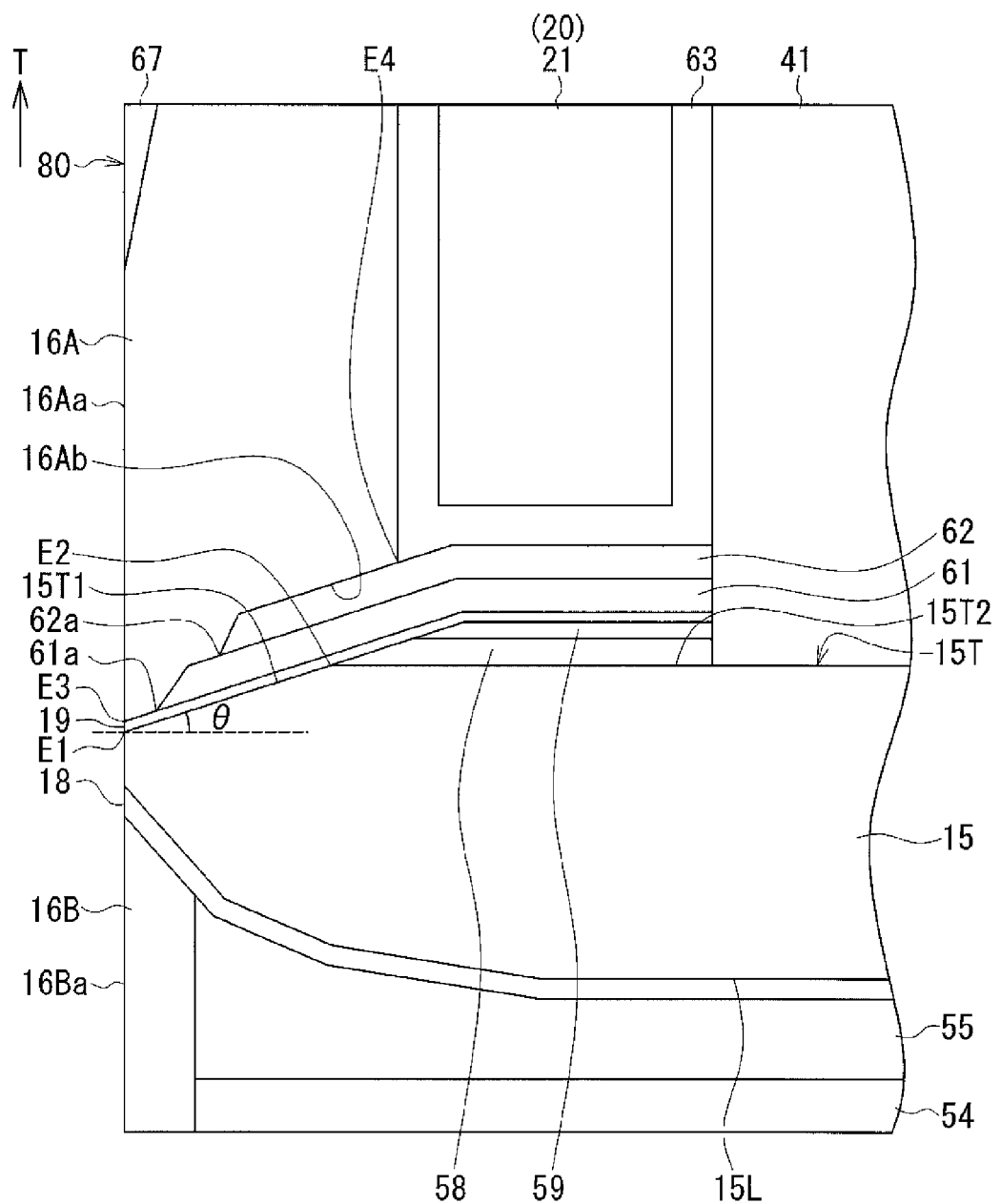
FIG. 2 is a cross-sectional view showing the main part of the magnetic head according to the first embodiment of the invention.

The shape of the main pole 15 will now be described in detail with reference to FIG. 2 to FIG. 7. FIG. 2 is a cross-sectional view showing the main part of the magnetic head according to the present embodiment. Note that FIG. 2 shows the main cross section. As shown in FIG. 5 to FIG. 7, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 2 to FIG. 4, the main pole 15 has the top surface 15T lying at the front end in the direction T of travel of the recording medium 90, the bottom end 15L opposite to the top surface 15T, the first side part, and the second side part. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 µm, for example. A zero neck height means that the track width defining portion 15A is not provided and an end face of the wide portion 15B is thus located in the medium facing surface 80.

The top surface 15T includes an inclined surface portion 15T1 and a flat surface portion 15T2. The inclined surface portion 15T1 has a first end E1 located in the medium facing surface 80 and a second end E2 opposite to the first end E1. The flat surface portion 15T2 is located farther from the medium facing surface 80 than is the inclined surface portion 15T1, and is connected to the inclined surface portion 15T1 at the second end E2. The entirety of the inclined surface portion 15T1 is inclined relative to the medium facing surface 80 and the direction perpendicular to the medium facing surface 80 such that the second end E2 is located on the front side in the direction T of travel of the recording medium relative to the first end E1. The flat surface portion 15T2 extends substantially perpendicular to the medium facing surface 80.

As shown in FIG. 2, the inclination angle of the inclined surface portion 15T1 relative to the direction perpendicular to the medium facing surface 80 is denoted by symbol θ. The inclination angle θ falls within the range of 20° to 35°, for example. The distance between the first end E1 and the second end E2 in the direction perpendicular to the medium facing surface 80 falls within the range of 0.10 to 0.45 µm, for example. The distance between the first end E1 and the second end E2 in the direction T of travel of the recording medium 90 falls within the range of 0.08 to 0.32 µm, for example.

The bottom end 15L includes an inclined portion and a flat portion. The inclined portion of the bottom end 15L has a first end located in the medium facing surface 80 and a second end opposite to the first end. The inclined portion of the bottom end 15L may be an edge formed by two intersecting planes, or may be a plane connecting two planes to each other. The flat portion of the bottom end 15L is a plane that is located farther from the medium facing surface 80 than is the inclined portion of the bottom end 15L, and is connected to the inclined portion at the second end of the inclined portion. The entirety of the inclined portion of the bottom end 15L is inclined relative to the medium facing surface 80 and the direction perpendicular to the medium facing surface 80 such that the second end is located on the rear side in the direction T of travel of the recording medium 90 relative to the first end. The flat portion of the bottom end 15L extends substantially perpendicular to the medium facing surface 80.

The end face of the main pole 15 located in the medium facing surface 80 has a first side adjacent to the first nonmagnetic layer 19, a second side connected to one end of the first side, and a third side connected to the other end of the first side. The first side defines the track width. The position of an end of a record bit to be recorded on the recording medium 90 is determined by the position of the first side. The width in the track width direction TW of the end face of the main pole 15 located in the medium facing surface 80 decreases with increasing distance from the first side, that is, with increasing proximity to the top surface 1a of the substrate 1. Each of the second side and the third side is at an angle of, for example, 7° to 17°, or preferably 10° to 15°, relative to the direction perpendicular to the top surface 1a of the substrate 1. The first side has a length in the range of 0.05 to 0.20 µm, for example.

Figure 1:
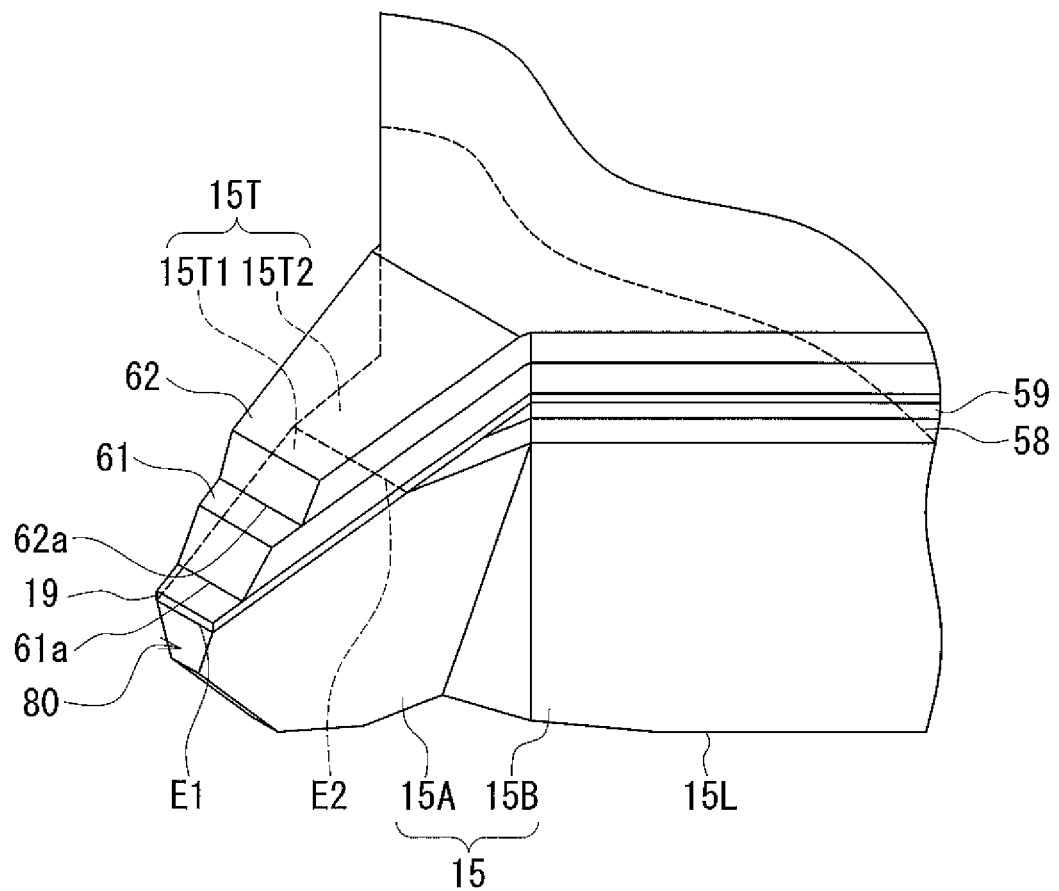
FIG. 1 is a perspective view showing the main part of a magnetic head according to a first embodiment of the invention.

The shape of the inclined portion 16Ab of the first shield 16A (the write shield 16) and the shapes and locations of the first to third nonmagnetic layers 19, 61 and 62 will now be described in detail with reference to FIG. 1 and FIG. 2. FIG. 1 is a perspective view showing the main part of the magnetic head according to the present embodiment. Note that FIG. 1 omits the illustration of portions of the first to third nonmagnetic layers 19, 61 and 62 and portions of the nonmagnetic metal layer 58 and the insulating layer 59 that are other than the portions thereof located directly above the main pole 15. The inclined portion 16Ab faces toward the top surface 15T of the main pole 15. The inclined portion 16Ab has a third end E3 located in the medium facing surface 80 and a fourth end E4 opposite to the third end E3. The inclined portion 16Ab is inclined relative to the medium facing surface 80 and the direction perpendicular to the medium facing surface 80 such that the fourth end E4 is located on the front side in the direction T of travel of the recording medium 90 relative to the third end E3.

The first nonmagnetic layer 19 is interposed between the inclined surface portion 15T1 and the inclined portion 16Ab, and has a first front end located in the medium facing surface 80.

The second nonmagnetic layer 61 is interposed between the first nonmagnetic layer 19 and the inclined portion 16Ab, and has a second front end 61a that is located closest to but at a distance from the medium facing surface 80. The distance from the medium facing surface 80 to the second front end 61a is smaller than the distance from the medium facing surface 80 to the second end E2 of the inclined surface portion 15T1. The distance from the medium facing surface 80 to the second front end 61a falls within the range of 0.06 to 0.12 μm, for example.

The third nonmagnetic layer 62 is interposed between the second nonmagnetic layer 61 and the inclined portion 16Ab, and has a third front end 62a closest to the medium facing surface 80. The distance from the medium facing surface 80 to the third front end 62a is greater than the distance from the medium facing surface 80 to the second front end 61a and smaller than the distance from the medium facing surface 80 to the second end E2 of the inclined surface portion 15T1. The distance from the medium facing surface 80 to the third front end 62a falls within the range of 0.12 to 0.40 μm, for example.

The inclined portion 16Ab includes a first surface in contact with the nonmagnetic layer 19, a second surface in contact with the nonmagnetic layer 61, and a third surface in contact with the nonmagnetic layer 62. Of the first to third surfaces, the first surface is the closest to the medium facing surface 80, the second surface is the second closest to the medium facing surface 80, and the third surface is the farthest from the medium facing surface 80. Only the first nonmagnetic layer 19 is interposed between the first surface and the inclined surface portion 15T1. The first and second nonmagnetic layers 19 and 61 are interposed between the second surface and the inclined surface portion 15T1, whereas the third nonmagnetic layer 62 is not interposed therebetween. The first to third nonmagnetic layers 19, 61 and 62 are interposed between the third surface and the inclined surface portion 15T1.

The function and effects of the magnetic head according to the present embodiment will now be described. The magnetic head writes data on the recording medium 90 by using the write head unit 9 and reads data stored on the recording medium 90 by using the read head unit 8. In the write head unit 9, the coil including the first coil portion 20 and the second coil portion 10 produces magnetic fields corresponding to data to be written on the recording medium 90. A magnetic flux corresponding to the magnetic field produced by the first coil portion 20 passes through the first return path section 40 and the main pole 15. A magnetic flux corresponding to the magnetic field produced by the second coil portion 10 passes through the second return path section 30 and the main pole 15. Consequently, the main pole 15 allows the magnetic flux corresponding to the magnetic field produced by the first coil portion 20 and the magnetic flux corresponding to the magnetic field produced by the second coil portion 10 to pass.

The first coil portion 20 and the second coil portion 10 may be connected in series or in parallel. In either case, the first coil portion 20 and the second coil portion 10 are connected such that the magnetic flux corresponding to the magnetic field produced by the first coil portion 20 and the magnetic flux corresponding to the magnetic field produced by the second coil portion 10 flow in the same direction through the main pole 15.

The main pole 15 allows the magnetic fluxes corresponding to the magnetic fields produced by the coil to pass as mentioned above, and produces a write magnetic field for writing data on the recording medium 90 by means of the perpendicular magnetic recording system.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face of the main pole 15 and spreads in directions other than the direction perpendicular to the surface of the recording medium 90, and thereby preventing the magnetic flux from reaching the recording medium 90.

Furthermore, the write shield 16 and the first and second return path sections 40 and 30 have the function of allowing a magnetic flux that has been produced from the end face of the main pole 15 and has magnetized a portion of the recording medium 90 to flow back. More specifically, a portion of the magnetic flux that has been produced from the end face of the main pole 15 and has magnetized the portion of the recording medium 90 flows back to the main pole 15 through the write shield 16 and the first return path section 40. Another portion of the magnetic flux that has been produced from the end face of the main pole 15 and has magnetized the portion of the recording medium 90 flows back to the main pole 15 through the write shield 16 and the second return path section 30.

The write shield 16 includes the first shield 16A, the second shield 16B and the two side shields 16C and 16D. The present embodiment thus makes it possible that, in regions on both the front side and the rear side in the direction T of travel of the recording medium 90 relative to the end face of the main pole 15 and regions on opposite sides of the end face of the main pole 15 in the track width direction TW, a magnetic flux that is produced from the end face of the main pole 15 and spreads in directions other than the direction perpendicular to the surface of the recording medium 90 can be captured and thereby prevented from reaching the recording medium 90. Consequently, the present embodiment makes it possible to prevent the occurrence of unwanted erasure.

Further, in the present embodiment, the top surface 15T of the main pole 15 includes the inclined surface portion 15T1, and the bottom end 15L of the main pole 15 includes the inclined portion. This feature of the present embodiment allows the main pole 15 to have a small thickness in the medium facing surface 80, and thereby allows for prevention of the unwanted erasure induced by a skew. On the other hand, since a portion of the main pole 15 located away from the medium facing surface 80 can have a large thickness, it is possible for the main pole 15 to guide much magnetic flux to the medium facing surface 80. This allows for the improvement of write characteristics such as the overwrite property.

Now, consider a magnetic head of a comparative example in which the second and third nonmagnetic layers 61 and 62 are not provided but the first nonmagnetic layer 19 is only provided between the inclined surface portion 15T1 of the top surface 15T of the main pole 15 and the inclined portion 16Ab of the write shield 16 (the first shield 16A). In this magnetic head of the comparative example, the inclined surface portion 15T1 and the inclined portion 16Ab are opposed to each other with only the first nonmagnetic layer 19 therebetween. This configuration raises the problem that much magnetic flux leaks from the main pole 15 to the write shield 16 to cause degradation of write characteristics such as the overwrite property. To avoid this, the inclined surface portion 15T1 may conceivably be reduced in length in the direction perpendicular to the medium facing surface 80. In that case, however, a small inclination angle θ would preclude a sufficient increase in the thickness of a portion of the main pole 15 located away from the medium facing surface 80. On the other hand, a large inclination angle θ would cause magnetic flux to easily leak from the inside to the outside of the main pole 15 in the vicinity of the corner formed by the inclined surface portion 15T1 and the flat surface portion 15T2.

In the magnetic head of the comparative example, the inclined portion 16Ab may also be reduced in length in the direction perpendicular to the medium facing surface 80 in order to avoid leakage of magnetic flux from the main pole 15 to the write shield 16. However, this causes a reduction in the volume of the first shield 16A, thereby compromising the function of the first shield 16A. More specifically, the reduction in the volume of the first shield 16A is likely to cause the saturation of magnetic flux in the first shield 16A. This in turn causes leakage of magnetic flux from the first shield 16A toward the medium facing surface 80, thus raising a problem that the leakage flux may cause accidental erasure of data stored on the recording medium 90.

To cope with this, in the present embodiment, the first to third nonmagnetic layers 19, 61 and 62 are interposed between the inclined surface portion 15T1 of the top surface 15T and the inclined portion 16Ab. The first front end of the first nonmagnetic layer 19 is located in the medium facing surface 80, whereas the second front end 61a of the second nonmagnetic layer 61 and the third front end 62a of the third nonmagnetic layer 62 are each located at a distance from the medium facing surface 80. These features of the present embodiment make it possible that, even if the inclined surface portion 15T1 and the inclined portion 16Ab are both increased in length in the direction perpendicular to the medium facing surface 80, the region in which the inclined surface portion 15T1 and the inclined portion 16Ab are opposed to each other with only the first nonmagnetic layer 19 interposed therebetween is reduced in area while the distance between the end face of the main pole 15 and the first end face portion 16Aa of the end face of the write shield 16 in the medium facing surface 80 is adjusted to a desired value determined by the thickness of the first nonmagnetic layer 19. It is thereby possible to reduce leakage of magnetic flux from the main pole 15 to the write shield 16.

Consequently, the present embodiment makes it possible to improve the write characteristics of the magnetic head without compromising the function of the write shield 16.

Note that in the magnetic head of the comparative example, if the first nonmagnetic layer 19 is increased in thickness in order to reduce leakage of magnetic flux from the main pole 15 to the write shield 16, the distance between the end face of the main pole 15 and the first end face portion 16Aa of the end face of the write shield 16 in the medium facing surface 80 becomes excessively large.

The third nonmagnetic layer 62 is omitted in a third embodiment to be described later. The present embodiment has the following advantage over the third embodiment. Specifically, by stacking the thin second and third nonmagnetic layers 61 and 62 in such a manner that the third front end 62a is located farther from the medium facing surface 80 than is the second front end 61a as in the present embodiment, it becomes possible to achieve a reduction in height of a step to be created in the inclined portion 16Ab by one nonmagnetic layer, when compared with the case of omitting the third nonmagnetic layer 62 and making the second nonmagnetic layer 61 thicker. The present embodiment thus makes it possible to prevent leakage of magnetic flux from the inside to the outside of the first shield 16A resulting from the step created in the inclined portion 16Ab.

The other effects provided by the present embodiment will now be described. If the first end face of the first coil surrounding portion constituted of the first shield 16A and the magnetic layers 41 to 44 is exposed over a large area in the medium facing surface 80, a portion of the magnetic flux captured into the first coil surrounding portion through a portion of the first end face located near the end face of the main pole 15 may leak toward the recording medium 90 through another portion of the first end face. This may result in the occurrence of unwanted erasure. On the other hand, if the first coil surrounding portion is reduced in dimension in the track width direction TW, the first coil surrounding portion decreases in volume and thus becomes prone to flux saturation. This may result in leakage of magnetic flux from the first end face toward the recording medium 90, and may thereby induce unwanted erasure.

In the present embodiment, the first coil surrounding portion is shaped to form the first coil receiving space, that is, shaped to surround a part of the first coil portion 20. This allows the first coil surrounding portion to be large in volume. On the other hand, the width in the track width direction TW of the first end face constituted of the first end face portion 16Aa of the first shield 16A is smaller than the maximum width in the track width direction TW of the first coil receiving space. This allows the first end face to be small in area. The present embodiment thus makes it possible that the first coil surrounding portion is large in volume while the first end face is small in area.

Likewise, the second coil surrounding portion constituted of the second shield 16B and the magnetic layers 31 to 34 is shaped to form the second coil receiving space, that is, shaped to surround a part of the second coil portion 10. This allows the second coil surrounding portion to be large in volume. On the other hand, the width in the track width direction TW of the second end face of the second coil surrounding portion constituted of the second end face portion 16Ba of the second shield 16B and the end face of the magnetic layer 32 is smaller than the maximum width in the track width direction TW of the second coil receiving space. This allows the second end face to be small in area. The present embodiment thus makes it possible that the second coil surrounding portion is large in volume while the second end face is small in area.

As discussed above, the present embodiment allows the first and second coil surrounding portions to be large in volume while allowing the first and second end faces exposed in the medium facing surface 80 to be small in area. Consequently, the present embodiment makes it possible to prevent leakage of magnetic flux from the first and second end faces that would occur in the case where the first and second end faces are exposed over a large area in the medium facing surface 80 or where the first and second coil surrounding portions are small in volume. The present embodiment thus allows for preventing unwanted erasure from occurring due to leakage of magnetic flux toward the recording medium 90 from the first and second end faces exposed in the medium facing surface 80.

A method of manufacturing the magnetic head according to the present embodiment will now be described. In the method of manufacturing the magnetic head according to the present embodiment, first, as shown in FIG. 3 and FIG. 4, the insulating layer 2, the first read shield layer 3, and the first read shield gap film 4 are formed in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 71, the middle shield layer 72 and the nonmagnetic layer 73 are formed in this order on the second read shield gap film 6.

Next, the magnetic layer 31 is formed on the nonmagnetic layer 73. Then, the insulating layer 51 is formed over the entire top surface of the stack. The insulating layer 51 is then polished by, for example, chemical mechanical polishing (hereinafter referred to as CMP), until the magnetic layer 31 is exposed. Next, the magnetic layers 32 and 33 are formed on the magnetic layer 31. The insulating film 52 is then formed over the entire top surface of the stack. Next, the second coil portion 10 is formed by frame plating, for example. The insulating layer 53 is then formed in the space between adjacent turns of the second coil portion 10. Then, an insulating layer (not illustrated) is formed over the entire top surface of the stack. The insulating film 52 and the non-illustrated insulating layer are then polished by, for example, CMP, until the second coil portion 10, the magnetic layers 32 and 33 and the insulating layer 53 are exposed.

Next, the insulating layer 54 is formed over the entire top surface of the stack. The insulating layer 54 is then selectively etched to form therein an opening for exposing part of the top surface of the magnetic layer 32, an opening for exposing the top surface of the magnetic layer 33, and an opening for exposing the coil connection 10S (see FIG. 5). Next, the second shield 16B is formed on the magnetic layer 32, the magnetic layer 34 is formed on the magnetic layer 33, and the first connecting layer (not illustrated) is formed on the coil connection 10S. Then, the nonmagnetic layer 55 is formed over the entire top surface of the stack. The nonmagnetic layer 55 is then polished by, for example, CMP, until the second shield 16B, the magnetic layer 34 and the first connecting layer are exposed.

Next, the second shield 16B and the nonmagnetic layer 55 are taper-etched in part by, for example, ion beam etching (hereinafter referred to as IBE). This etching also etches part of the magnetic layer 34. Then, the side shields 16C and 16D are formed on the second shield 16B. Next, the nonmagnetic film 18 is formed over the entire top surface of the stack. The nonmagnetic film 18 is then selectively etched to form therein an opening for exposing the top surface of the magnetic layer 34 and an opening for exposing the top surface of the first connecting layer.

The main pole 15 is formed next. Further, the second connecting layer (not illustrated) is formed on the first connecting layer. The main pole 15 and the second connecting layer are formed such that their top surfaces are higher in level than portions of the nonmagnetic film 18 lying on the side shields 16C and 16D. Next, the first refill layer (not illustrated) is formed over the entire top surface of the stack. The first refill layer, the main pole 15 and the second connecting layer are then polished by, for example, CMP, until the portions of the nonmagnetic film 18 lying on the side shields 16C and 16D are exposed.

Figure 8:
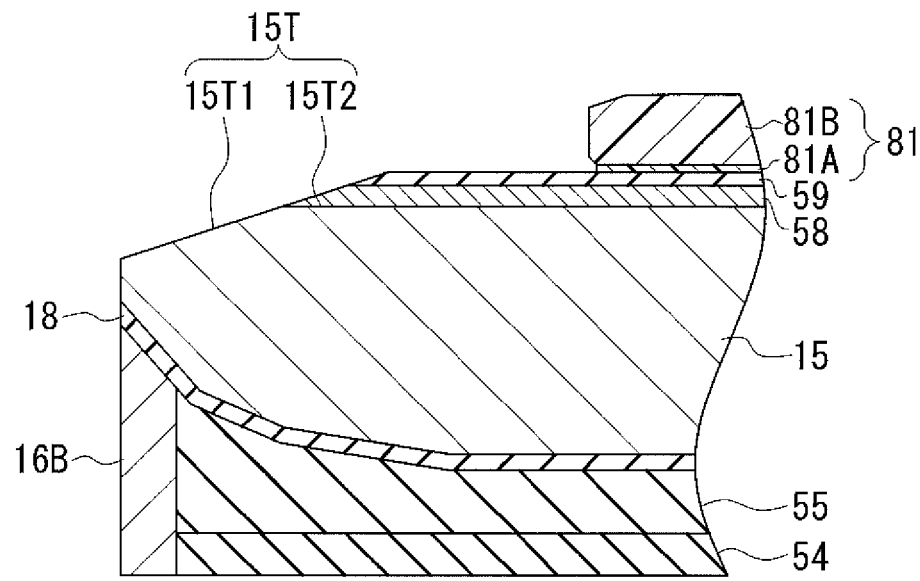
FIG. 8 is a cross-sectional view showing a step of a method of manufacturing the magnetic head according to the first embodiment of the invention.
Figure 9:
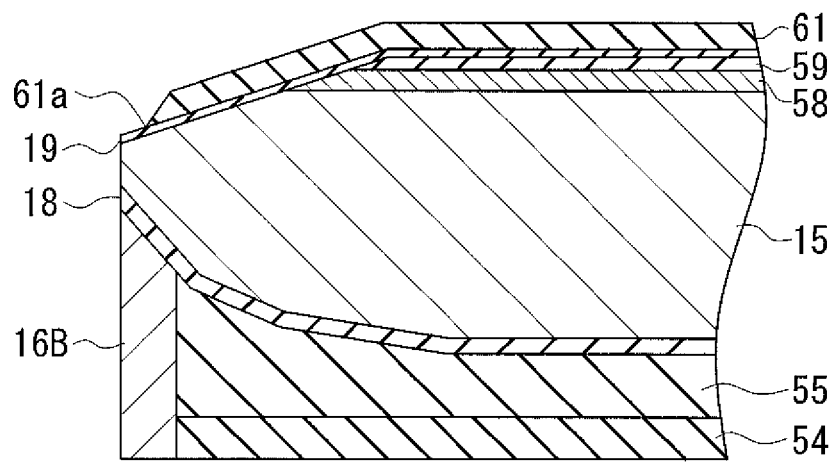
FIG. 9 is a cross-sectional view showing a step that follows the step shown in FIG. 8.
Figure 10:
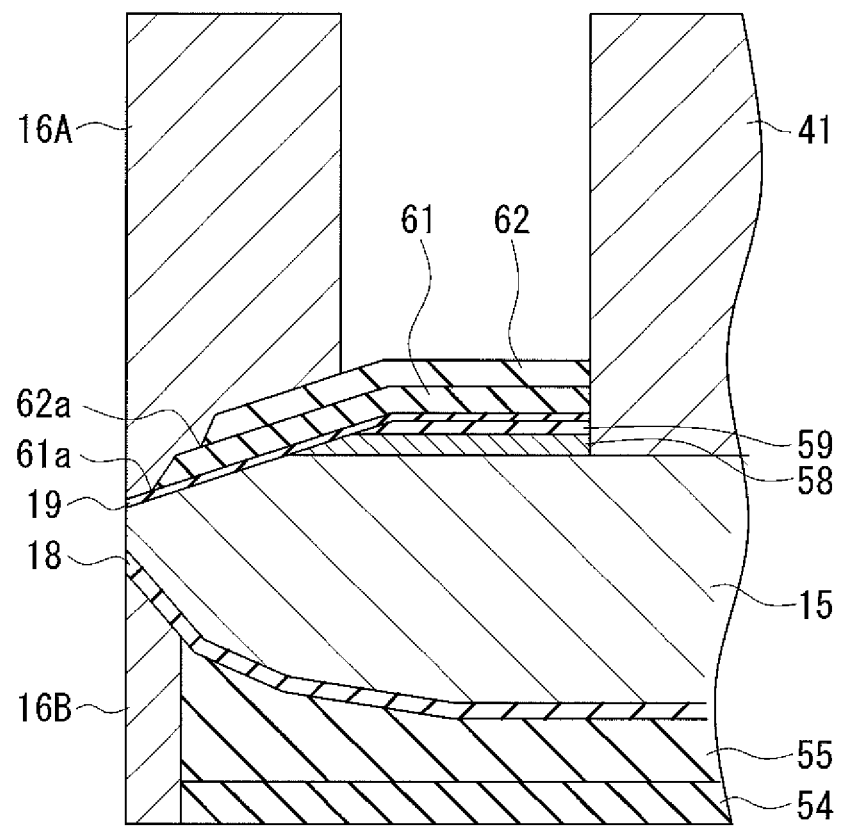
FIG. 10 is a cross-sectional view showing a step that follows the step shown in FIG. 9.

Reference is now made to FIG. 8 to FIG. 10 to describe a series of steps to be performed after the foregoing step up to the formation of the first shield 16A and the magnetic layer 41. FIG. 8 to FIG. 10 each illustrate a stack of layers formed in the process of manufacturing the magnetic head. Each of FIG. 8 to FIG. 10 shows the main cross section. Portions that are closer to the substrate 1 relative to the second shield 16B and the insulating layer 54 are omitted from FIG. 8 to FIG. 10.

FIG. 8 shows a step that follows the polishing of the first refill layer, the main pole 15 and the second connecting layer. In this step, first, the nonmagnetic metal layer 58 and the insulating layer 59 are formed in this order on the main pole 15. Next, an etching mask 81 having an undercut is formed on the insulating layer 59. The etching mask 81 includes, for example, a lower layer 81A lying on the insulating layer 59 and an upper layer 81B lying on the lower layer 81A. The upper layer 81B is formed of a photoresist patterned by photolithography. The lower layer 81A is formed of, for example, a material that dissolves in a developing solution that is used in patterning the upper layer 81B. The etching mask 81 does not cover a portion of the top surface of the stack located near the position at which the medium facing surface 80 is to be formed.

Next, portions of the main pole 15, the side shields 16C and 16D, the nonmagnetic metal layer 58, the insulating layer 59 and the first refill layer are taper-etched by, for example, IBE, using the etching mask 81. This etching is performed to provide the top surface 15T of the main pole 15 with the inclined surface portion 15T1. In the top surface 15T of the main pole 15, a portion that remains unetched makes the flat surface portion 15T2. Then, the etching mask 81 is removed.

FIG. 9 shows the next step. In this step, first, the first nonmagnetic layer 19 is formed to cover the main pole 15, the side shields 16C and 16D, the nonmagnetic metal layer 58 and the insulating layer 59. Next, the second nonmagnetic layer 61 is formed on the first nonmagnetic layer 19. The second nonmagnetic layer 61 may be formed by a lift-off process.

In this case, a mask (not illustrated) having an opening in the position where to form the second nonmagnetic layer 61 is first formed on the first nonmagnetic layer 19. Then, with the mask left unremoved, the second nonmagnetic layer 61 is formed over the entire top surface of the stack. The mask is then lifted off.

Another possible method for forming the second nonmagnetic layer 61 is to first form a nonmagnetic film on the first nonmagnetic layer 19 and then etch the nonmagnetic film in part. The etching is performed by, for example, reactive ion etching (hereinafter referred to as RIE) after an etching mask (not illustrated) is formed on a portion of the nonmagnetic film that is to become the second nonmagnetic layer 61. In the case of forming the second nonmagnetic layer 61 by this method, an etching stopper film of Ru, for example, may be formed on the first nonmagnetic layer 19 before the nonmagnetic film is formed, and the nonmagnetic film may be etched such that the etching is stopped at the level of the boundary between the etching stopper film and the nonmagnetic film. Alternatively, the first nonmagnetic layer 19 and the nonmagnetic film (the second nonmagnetic layer 61) may be formed of different materials so that the nonmagnetic film can be etched under the condition that the etching selectivity thereof is higher. Possible combinations of materials for the first nonmagnetic layer 19 and the nonmagnetic film (the second nonmagnetic layer 61) in this case include, for example, a combination of alumina and $SiO_2$, and a combination of a nonmagnetic metal material such as Ru and an inorganic insulating material such as alumina or $SiO_2$.

FIG. 10 shows the next step. In this step, first, the third nonmagnetic layer 62 is formed on the second nonmagnetic layer 61. The third nonmagnetic layer 62 may be formed by a lift-off process, or alternatively, by first forming a nonmagnetic film on the second nonmagnetic layer 61 and then etching the nonmagnetic film in part, as with the case of forming the second nonmagnetic layer 61. Next, RIE or IBE, for example, is performed to etch portions of the first to third nonmagnetic layers 19, 61 and 62 to thereby form two openings for exposing the top surfaces of the side shields 16C and 16D, and etch other portions of the first to third nonmagnetic layers 19, 61 and 62 and portions of the nonmagnetic metal layer 58 and the insulating layer 59 to thereby form an opening for exposing the top surface 15T of the main pole 15. Next, the first shield 16A is formed on the side shields 16C and 16D and the first to third nonmagnetic layers 19, 61 and 62, and the magnetic layer 41 is formed on the main pole 15.

Now, steps to follow the formation of the first shield 16A and the magnetic layer 41 will be described with reference to FIG. 3 and FIG. 4. First, the first to third nonmagnetic layers 19, 61 and 62 are selectively etched to form therein an opening for exposing the top surface of the second connecting layer. Next, the insulating film 63 is formed over the entire top surface of the stack. The insulating film 63 is then selectively etched to form therein an opening for exposing the top surface of the second connecting layer. Next, the first layer 21 of the first coil portion 20 is formed on the insulating film 63 by frame plating, for example. Then, the second refill layer (not illustrated) is formed over the entire top surface of the stack. The insulating film 63 and the second refill layer are then polished by, for example, CMP, until the first shield 16A, the first layer 21 and the magnetic layer 41 are exposed.

Next, the insulating layer 64 is formed over the entire top surface of the stack. The insulating layer 64 is then selectively etched to form therein two openings for exposing the top surfaces of the first shield 16A and the magnetic layer 41. Next, the magnetic layer 42 is formed on the first shield 16A and the magnetic layer 43 is formed on the magnetic layer 41. Then, the insulating film 65 is formed over the entire top surface of the stack. The insulating layer 64 and the insulating film 65 are then selectively etched to form therein an opening for exposing the coil connection 21S (see FIG. 6). Next, the second layer 22 of the first coil portion 20 is formed on the insulating film 65 by frame plating, for example. Then, the third refill layer (not illustrated) is formed over the entire top surface of the stack. The insulating film 65 and the third refill layer are then polished by, for example, CMP, until the second layer 22 and the magnetic layers 42 and 43 are exposed.

Next, the insulating layer 66 is formed over the entire top surface of the stack. The insulating layer 66 is then selectively etched to form therein two openings for exposing the top surfaces of the magnetic layers 42 and 43. Next, the magnetic layer 44 is formed on the magnetic layers 42 and 43 and the insulating layer 66. The first shield 16A and the magnetic layers 42 and 44 are then etched by, for example, RIE or IBE so as to provide the first shield 16A with the connecting surface mentioned previously, and provide the magnetic layers 42 and 44 with the respective end faces mentioned previously. Next, the nonmagnetic layer 67 is formed over the entire top surface of the stack. The nonmagnetic layer 67 is then polished by, for example, CMP, until the magnetic layer 44 is exposed.

Next, the protective layer 70 is formed to cover the entire top surface of the stack. Wiring, terminals and other components are then formed on the protective layer 70, the substrate is cut for individual sliders, and processing including polishing of the medium facing surface 80 and fabrication of flying rails is performed to complete the magnetic head.

Second Embodiment

Figure 11:
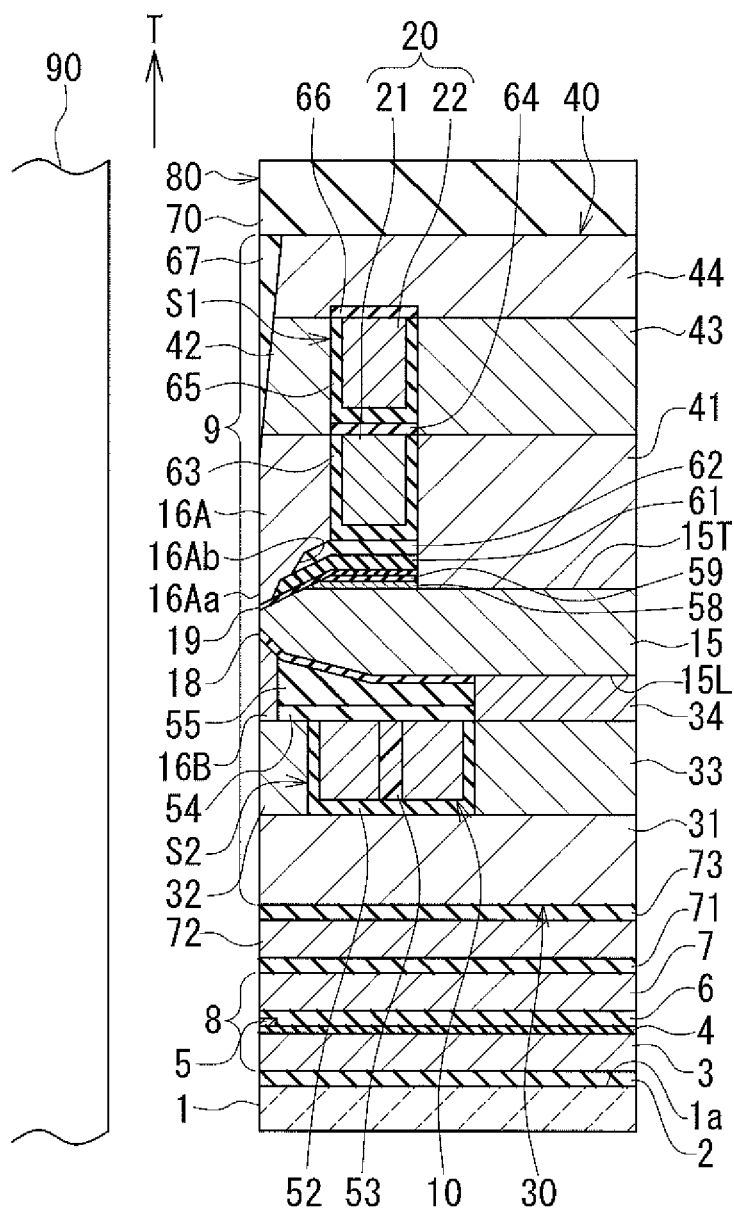
FIG. 11 is a cross-sectional view of a magnetic head according to a second embodiment of the invention.

A magnetic head according to a second embodiment of the invention will now be described with reference to FIG. 11. FIG. 11 is a cross-sectional view of the magnetic head according to the present embodiment. FIG. 11 shows the main cross section. In the present embodiment, the magnetic layer 31 has an end face located in the medium facing surface 80. The remainder of configuration, function and effects of the present embodiment are similar to those of the first embodiment.

Third Embodiment

Figure 12:
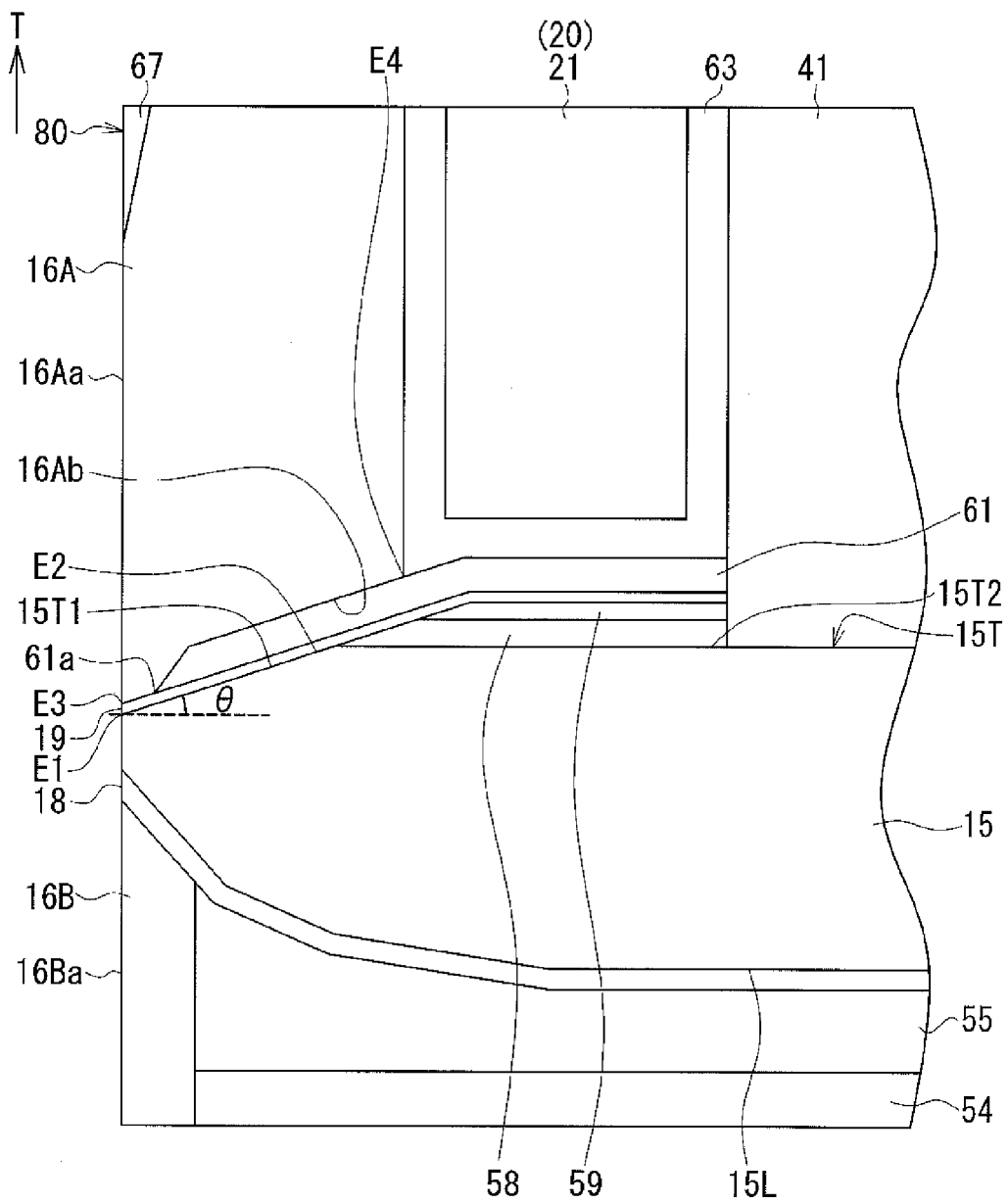
FIG. 12 is a cross-sectional view showing the main part of a magnetic head according to a third embodiment of the invention.

A magnetic head according to the third embodiment of the invention will now be described with reference to FIG. 12. FIG. 12 is a cross-sectional view showing the main part of the magnetic head according to the present embodiment. FIG. 12 shows the main cross section. The third nonmagnetic layer 62 is not provided in the present embodiment. Thus, the present embodiment cannot provide the effect resulting from the presence of the third nonmagnetic layer 62.

As with the second embodiment, the magnetic layer 31 may have an end face located in the medium facing surface 80 (see FIG. 11). The remainder of configuration, function and effects of the present embodiment are similar to those of the first or second embodiment.

The present invention is not limited to the foregoing embodiments, and various modifications may be made thereto. For example, the magnetic head of the present invention may further include one or more nonmagnetic layers interposed between the inclined portion 16Ab and the third nonmagnetic layer 62 of the first embodiment.

Further, as far as the requirements of the appended claims are met, the shapes and locations of the second and third nonmagnetic layers 61 and 62 and the lengths of the inclined surface portion 15T1 and the inclined portion 16Ab in the direction perpendicular to the medium facing surface 80 are not limited to the respective examples illustrated in the foregoing embodiments but can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:

a medium facing surface facing a recording medium;

a coil producing a magnetic field that corresponds to data to be written on the recording medium;

a main pole having an end face located in the medium facing surface, the main pole allowing a magnetic flux that corresponds to the magnetic field produced by the coil to pass, and producing a write magnetic field for writing the data on the recording medium; and a write shield formed of a magnetic material and having an end face located in the medium facing surface, wherein the end face of the write shield includes a first end face portion located on a front side in a direction of travel of the recording medium relative to the end face of the main pole, the main pole has a top surface lying at a front end in the direction of travel of the recording medium, the top surface of the main pole includes an inclined surface portion, the inclined surface portion has a first end located in the medium facing surface and a second end opposite to the first end, an entirety of the inclined surface portion is inclined relative to the medium facing surface and a direction perpendicular to the medium facing surface such that the second end is located on the front side in the direction of travel of the recording medium relative to the first end, the write shield includes an inclined portion facing toward the top surface of the main pole, the inclined portion has a third end located in the medium facing surface and a fourth end opposite to the third end, the inclined portion is inclined relative to the medium facing surface and the direction perpendicular to the medium facing surface such that the fourth end is located on the front side in the direction of travel of the recording medium relative to the third end, the magnetic head further comprises a first nonmagnetic layer and a second nonmagnetic layer, the first nonmagnetic layer is interposed between the inclined surface portion and the inclined portion, and has a first front end located in the medium facing surface, the second nonmagnetic layer is interposed between the first nonmagnetic layer and the inclined portion, and has a second front end that is located closest to but at a distance from the medium facing surface, and the distance from the medium facing surface to the second front end is smaller than a distance from the medium facing surface to the second end of the inclined surface portion.

2. The magnetic head for perpendicular magnetic recording according to claim 1, wherein the top surface of the main pole further includes a flat surface portion that is located farther from the medium facing surface than is the inclined surface portion, and the flat surface portion is connected to the inclined surface portion at the second end and extends substantially perpendicular to the medium facing surface.

3. The magnetic head for perpendicular magnetic recording according to claim 1, further comprising a third nonmagnetic layer, wherein the third nonmagnetic layer is interposed between the second nonmagnetic layer and the inclined portion, and has a third front end closest to the medium facing surface, and a distance from the medium facing surface to the third front end is greater than the distance from the medium facing surface to the second front end and smaller than the distance from the medium facing surface to the second end of the inclined surface portion.

4. The magnetic head for perpendicular magnetic recording according to claim 1, further comprising a first return path section formed of a magnetic material, wherein the first return path section is located on the front side in the direction of travel of the recording medium relative to the main pole, and connects the write shield and part of the main pole located away from the medium facing surface to each other so that a first space is defined by the main pole, the write shield and the first return path section, and the coil includes a first coil portion passing through the first space.

5. The magnetic head for perpendicular magnetic recording according to claim 1, wherein the end face of the write shield includes a second end face portion located on a rear side in the direction of travel of the recording medium relative to the end face of the main pole.

6. The magnetic head for perpendicular magnetic recording according to claim 5, further comprising a first return path section and a second return path section each formed of a magnetic material, wherein the first return path section is located on the front side in the direction of travel of the recording medium relative to the main pole, and connects the write shield and part of the main pole located away from the medium facing surface to each other so that a first space is defined by the main pole, the write shield and the first return path section, the second return path section is located on the rear side in the direction of travel of the recording medium relative to the main pole, and connects the write shield and part of the main pole located away from the medium facing surface to each other so that a second space is defined by the main pole, the write shield and the second return path section, and the coil includes a first coil portion passing through the first space and a second coil portion passing through the second space.

7. The magnetic head for perpendicular magnetic recording according to claim 6, wherein the end face of the write shield further includes a third end face portion and a fourth end face portion, the third end face portion and the fourth end face portion being located on opposite sides of the end face of the main pole in a track width direction.

* * * * *